United States Patent
Hsu et al.

(10) Patent No.: US 7,185,223 B2
(45) Date of Patent: Feb. 27, 2007

(54) LOGICAL PARTITIONING IN REDUNDANT SYSTEMS

(75) Inventors: Yu-Cheng Hsu, Tucson, AZ (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 10/675,323

(22) Filed: Sep. 29, 2003

(65) Prior Publication Data

US 2005/0081092 A1 Apr. 14, 2005

(51) Int. Cl.
*G06F 11/00* (2006.01)

(52) U.S. Cl. ............................................. 714/6
(58) Field of Classification Search .................. 714/6
See application file for complete search history.

(56) References Cited

U.S. PATENT DOCUMENTS

| | | | | |
|---|---|---|---|---|
| 3,889,237 A | * | 6/1975 | Alferness et al. | 711/148 |
| 5,072,373 A | * | 12/1991 | Dann | 709/201 |
| 5,659,786 A | * | 8/1997 | George et al. | 713/100 |
| 5,784,702 A | * | 7/1998 | Greenstein et al. | 711/173 |
| 5,987,566 A | | 11/1999 | Vishlitzky et al. | |
| 6,223,202 B1 | * | 4/2001 | Bayeh | 718/102 |
| 6,247,109 B1 | * | 6/2001 | Kleinsorge et al. | 712/13 |
| 6,260,068 B1 | * | 7/2001 | Zalewski et al. | 709/226 |
| 6,279,098 B1 | * | 8/2001 | Bauman et al. | 712/13 |
| 6,366,945 B1 | * | 4/2002 | Fong et al. | 718/104 |
| 6,438,573 B1 | * | 8/2002 | Nilsen | 718/100 |
| 6,453,392 B1 | * | 9/2002 | Flynn, Jr. | 711/151 |
| 6,463,573 B1 | | 10/2002 | Maddalozzo, Jr. et al. | |
| 6,530,035 B1 | | 3/2003 | Bridge | |
| 6,542,975 B1 | | 4/2003 | Evers et al. | |
| 6,557,123 B1 | | 4/2003 | Wiencko, Jr. et al. | |
| 6,625,638 B1 | * | 9/2003 | Kubala et al. | 718/105 |
| 6,665,759 B2 | * | 12/2003 | Dawkins et al. | 710/200 |
| 6,694,419 B1 | * | 2/2004 | Schnee et al. | 711/173 |
| 6,901,537 B2 | * | 5/2005 | Dawkins et al. | 714/43 |
| 2002/0046358 A1 | | 4/2002 | Terzioglu | |
| 2002/0156612 A1 | * | 10/2002 | Schulter et al. | 703/23 |
| 2003/0084241 A1 | | 5/2003 | Lubbers et al. | |
| 2003/0140069 A1 | * | 7/2003 | Bobak | 707/204 |
| 2004/0236987 A1 | * | 11/2004 | Greenspan et al. | 714/13 |

OTHER PUBLICATIONS

Compaq/HP, "TruCluster Server Product"[online]http://h30097.www3.hp.com/docs/cluster_doc/cluster_50/TCR_HCFG/CHNTRXXX.HTM.

* cited by examiner

*Primary Examiner*—Robert Beausoliel
*Assistant Examiner*—Amine Riad
(74) *Attorney, Agent, or Firm*—Rabindranath Dutta; Konrad Raynes & Victor LLP

(57) ABSTRACT

Provided are a method, system, and article of manufacture, wherein a plurality of processing nodes in a storage system are partitioned into a plurality of logical processing units, and wherein the plurality of logical processing units can respond to I/O requests from a host coupled to the storage system. At least two logical processing units are grouped, wherein data in a first storage coupled to a first logical processing unit of the least two logical processing units is mirrored by data in a second storage coupled to the second logical processing unit of the at least two logical processing units. In response to a failure of the first logical processing unit, an I/O request from the host is responded to via the second logical processing unit.

27 Claims, 8 Drawing Sheets

LOGICAL PARTITIONING IN REDUNDANT SYSTEMS

BACKGROUND

1. Field

The present disclosure relates to a method, system, and an article of manufacture for logical partitioning in redundant systems.

2. Description of Related Art

Redundant information technology systems, including storage systems, may store the same data in multiple nodes, where a node may be a computational unit, a storage unit, etc. When one node of a redundant system is unavailable, an alternate node of the redundant system may be used to substitute the unavailable node.

An enterprise storage server (ESS), such as the IBM* TotalStorage Enterprise Storage Server*, may be a disk storage server that includes one or more processors coupled to storage devices, including high capacity scalable storage devices, Redundant Array of Independent Disks (RAID), etc. The ESS may be connected to a network and include features for copying data in storage systems. An ESS that includes a plurality of nodes, where a node may have a plurality of processors, may be used as a redundant information technology system.

*IBM, IBM TotalStorage Enterprise Storage Server, Enterprise System Connection (ESCON), OS/390 are trademarks of International Business Machines Corp.

In ESS units that have a plurality of nodes, a pair of nodes may provide redundancy. For example, one node may be referred to as a primary node and another node may be referred to as a secondary node. If the primary node fails, the secondary node takes over and performs the functions of the primary node.

In many redundant systems that use a primary node and a secondary node to provide redundancy, entire nodes may fail. However, the failure of an entire node, especially in situations where the failed node includes multiple central processing units (CPUs), can cause system performance to degrade.

SUMMARY

Provided are a method, system, and article of manufacture, wherein a plurality of processing nodes in a storage system are partitioned into a plurality of logical processing units, and wherein the plurality of logical processing units can respond to I/O requests from a host coupled to the storage system. At least two logical processing units are grouped, wherein data in a first storage coupled to a first logical processing unit of the least two logical processing units is mirrored by data in a second storage coupled to the second logical processing unit of the at least two logical processing units. In response to a failure of the first logical processing unit, an I/O request from the host is responded to via the second logical processing unit.

In further embodiments, the storage system has at least two processing nodes, wherein the plurality of logical processing units are distributed across the at least two processing nodes, wherein one processing node includes a plurality of central processing units, and wherein in the event of the failure of the first logical processing unit, the plurality of processing nodes stay operational.

In additional embodiments, an administrative console is coupled to the plurality of processing nodes of the storage system. Information on processing requirements, memory requirements and host bus adapter requirements for the plurality of logical processing units are processed at the administrative console prior to partitioning.

In yet additional embodiments, one or more partitioning applications are coupled to the plurality of logical processing units. In response to grouping the at least two logical processing units, initial program load of the first logical processing unit is started. The one or more partitioning applications determine an identification of the second logical processing unit grouped with the first logical processed unit. The one or more partitioning applications present common resources to the first and second logical processing units.

In further embodiments, a request for memory access of a logical processing unit is received from the first logical processing unit. One or more partitioning applications coupled to the plurality of logical processing units determine whether the logical processing unit is grouped with the first logical processing unit. If the logical processing unit is grouped with the first logical processing unit, then the memory access of the logical processing unit is allowed to the first logical processing unit. If the logical processing unit is not grouped with the first logical processing unit, then the memory access of the logical processing unit is prevented to the first logical processing unit.

In still further embodiments, a write request is received from the host to the plurality of processing nodes in the storage system. One or more partitioning applications write data corresponding to the write request to the first storage coupled to the first logical processing unit and the second storage coupled to the second logical processing unit.

In yet additional implementations, a read request is received from the host to the plurality of processing nodes in the storage system. One or more partitioning applications read data corresponding to the read request from the first storage coupled to the first logical processing unit.

In further implementations, the partitioning and grouping are performed by one or more partitioning applications coupled to the plurality of processing nodes, wherein the one or more partitioning applications comprise a hypervisor application of a redundant system.

The implementations create a plurality of logical processing units from a plurality of processing nodes in a storage system. A pair of logical processing units form a redundant system, where if logical processing unit is unavailable, the other logical processing unit may be used to substitute the unavailable logical processing unit. In certain embodiments, in the event of a failure of a logical processing unit, the processing node that includes the failed logical processing unit continues to operate.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations. It is understood that other implementations may be utilized and structural and operational changes may be made without departing from the scope of the present implementations.

Figure 1:
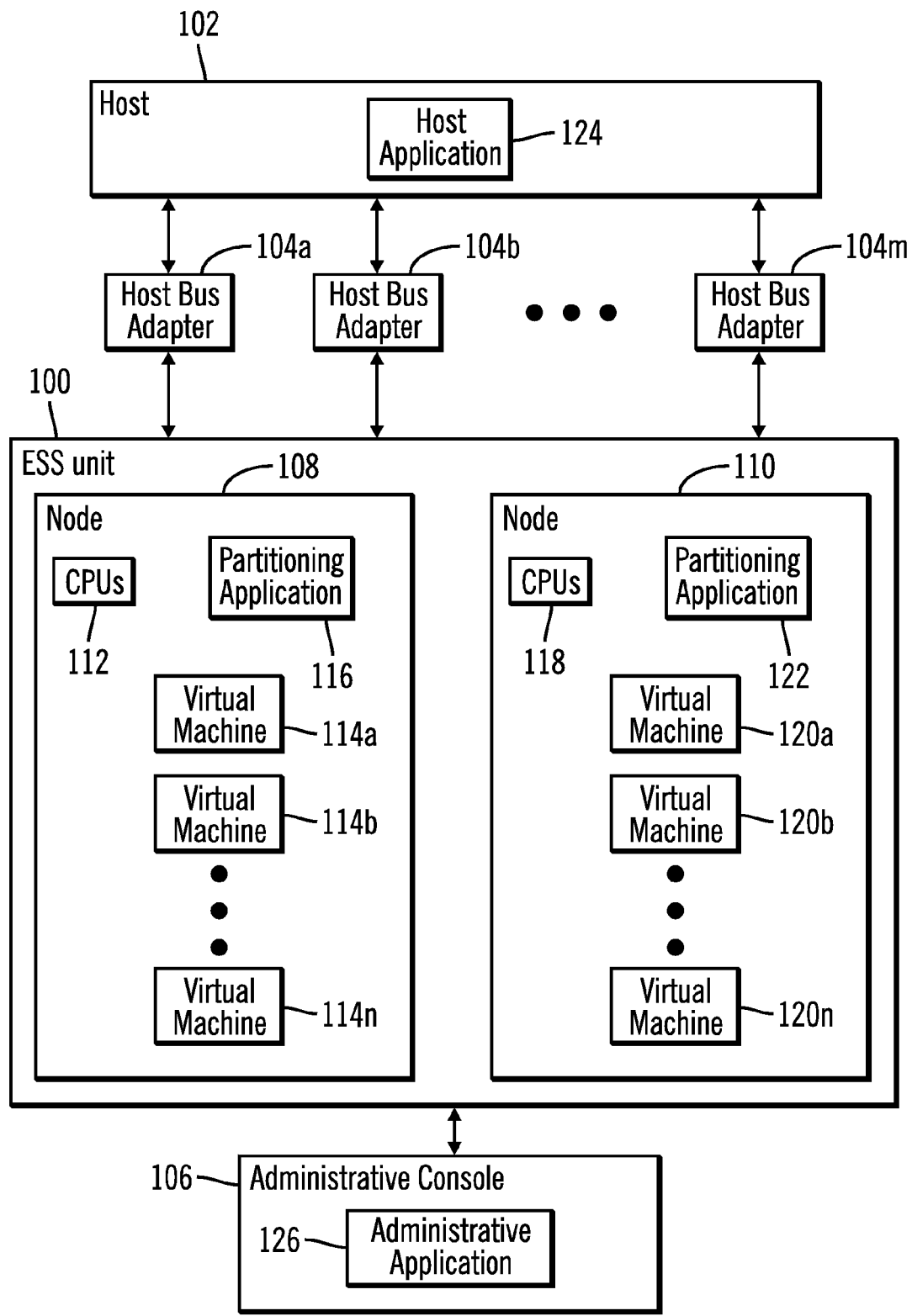
FIG. 1 illustrates a block diagram of a computing environment, in accordance with certain described aspects of the invention.

FIG. 1 illustrates a block diagram of a computing environment, in accordance with certain described aspects of the invention. A storage system, such as an ESS unit 100 is coupled to at least one host 102 via one more host bus adapters 104a . . . 104m. The ESS unit 100 is also coupled to an administrative console 106.

The ESS unit 100 may include two nodes 108, 110, where a node may be a processing node, such as, a computational unit. A node may have one or more central CPUs and may be partitioned into one or more logical processing units, such as, virtual machines, by a partitioning application. For example, the node 108 may have one or more CPUs 112, and the node 108 may be partitioned into the virtual machines 114a . . . 114n by a partitioning application 116. Similarly, the node 110 may have one or more CPUs 118, and the node 110 may be partitioned into virtual machines 120a . . . 120n by a partitioning application 122. A virtual machine, such as virtual machines 114a . . . 114n, 120a . . . 120n, may appear as computational unit to the host 102.

While the ESS unit 100 is shown as including two nodes 108 and 110, in alternative embodiments the ESS unit 100 may include a fewer or a larger number of nodes. For example, in certain embodiments the ESS unit 100 may comprise of only one node partitioned into a plurality of virtual machines, and in certain embodiments the ESS unit 100 may comprise of three nodes where the nodes may be partitioned into one or more virtual machines. In alternative embodiments, instead of the ESS unit 100, other computational or storage systems may be used, where the other computational or storage systems are partitioned into a plurality of virtual machines.

In certain embodiments, the host 102, and the nodes 108, 110 may be a device such as a personal computer, a workstation, a server, a mainframe, a hand held computer, a palm top computer, a telephony device, network appliance, etc. The host 102 may include any operating system (not shown), such as the IBM OS/390* operating system. The host 102 may also include at least one host application 124 that sends Input/Output (I/O) requests to the ESS unit 100.

*IBM, IBM TotalStorage Enterprise Storage Server, Enterprise Systewm Connection (ESCON), OS/390 are trademarks of International Machines Corp.

The host bus adapters 104a . . . 104m operate over Enterprise System Connection (ESCON)* channels or any other data interface mechanism (e.g., fibre channel, Storage Area Network (SAN) interconnections, etc.) and may allow communication between the host 102 and the plurality of virtual machines 114a . . . 114n, 120a . . . 120n. For example, in certain embodiments, the host bus adapter 104a may allow the host 102 to communicate with the virtual machines 114a, 120a, and the host bus adapter 104b may allow the host 102 to communicate with the virtual machines 114b, 120b.

*IBM, IBM TotalStorage Enterprise Storage Server, Enterprise Systewm Connection (ESCON), OS/390 are trademarks of International Machines Corp.

The administrative console 106, may be a device, such as a personal computer, a workstation, a server, a mainframe, a hand held computer, a palm top computer, a telephony device, network appliance, etc., that is used to administer the ESS unit 100. In certain embodiments, the administrative console 106 may include an administrative application 126 that is used to configure the ESS unit 100.

Therefore, FIG. 1 illustrates a computing environment where the host application 124 sends I/O requests to the ESS unit 100. The ESS unit 100 maintains a redundant system to satisfy the I/O requests by grouping the virtual machines into pairs, i.e., partners. If one virtual machine of a pair is unavailable to satisfy the I/O requests, then the other virtual machine of the pair can satisfy the I/O requests.

Figure 2:
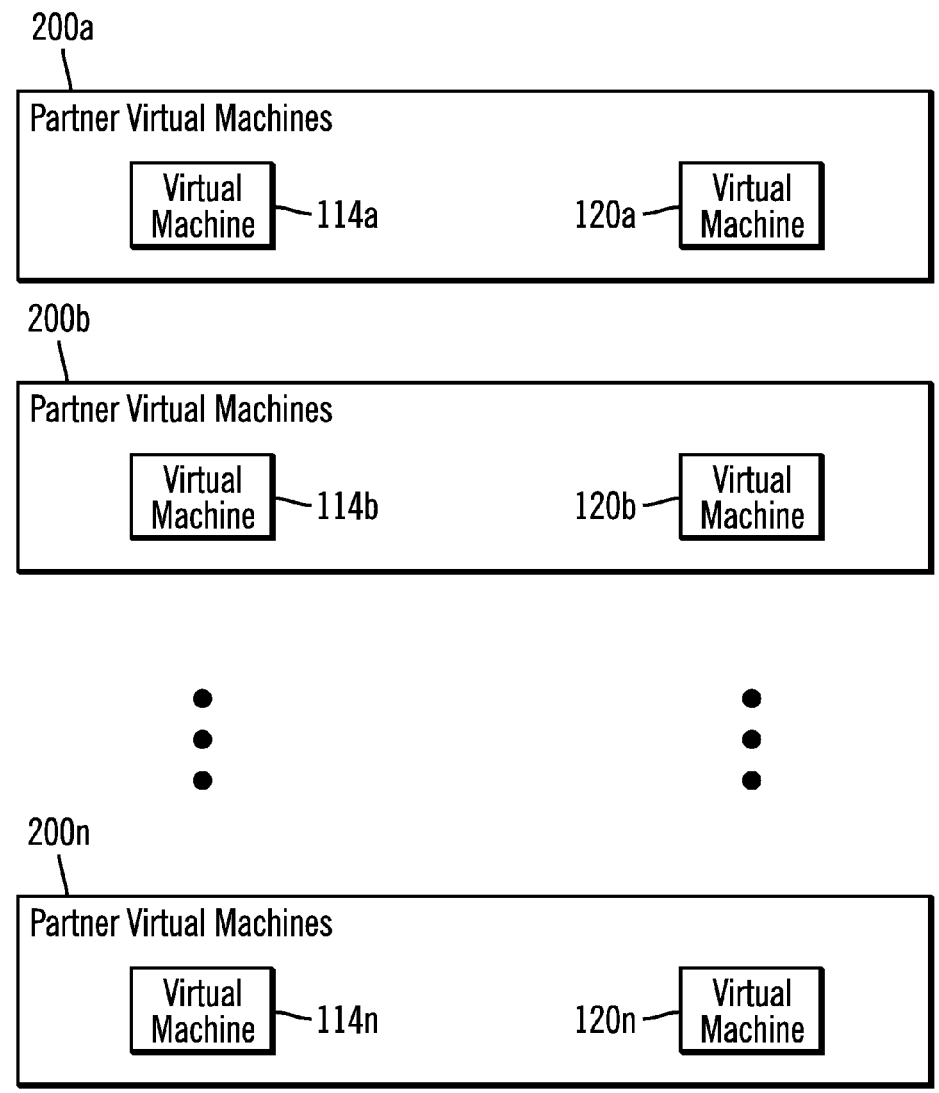
FIG. 2 illustrates a block diagram of partner virtual machines, in accordance with certain described implementations of the invention.

FIG. 2 illustrates a block diagram of partner virtual machines 200a . . . 200n, in accordance with certain described implementations of the invention. Partner virtual machines, such as, partner virtual machines 200a, may include two virtual machines. For example, in certain embodiments partner virtual machines 200a include virtual machines 114a and 120a, partner virtual machines 200b include virtual machines 114b and 120b, and partner virtual machines 200n include virtual machines 114n and 120n. Therefore, partner virtual machines may include a virtual machine from node 108 and another virtual machine from node 110.

Partner virtual machines are comprised of two virtual machines, where a virtual machine may be referred to as a partner of the other virtual machine. For example, partner virtual machines 200b are comprised of virtual machines 114b and 120b. Therefore, virtual machine 114b is a partner virtual machine of virtual machine 120b and vice versa.

Data in a first storage coupled to a first virtual machine of partner virtual machines is mirrored by data in a second storage coupled to a second virtual machine of the partner virtual machines. For example, data in storage of virtual machine 114a may be mirrored by data in storage of virtual machine 120a. The first virtual machine may be referred to as a primary virtual machine and the second virtual machine may be referred to as a secondary virtual machine. The virtual machines can respond to I/O requests from the host 102, sent by the host application 124 via the host bus adapters 104a . . . 104m to the ESS unit 100.

Therefore, FIG. 2 illustrates how partner virtual machines 200a . . . 200n are set up within the ESS unit 100. The partner virtual machines create a redundant system, wherein if one virtual machine fails the other virtual machine included in the partner machines can substitute the failed virtual machine.

Figure 3:
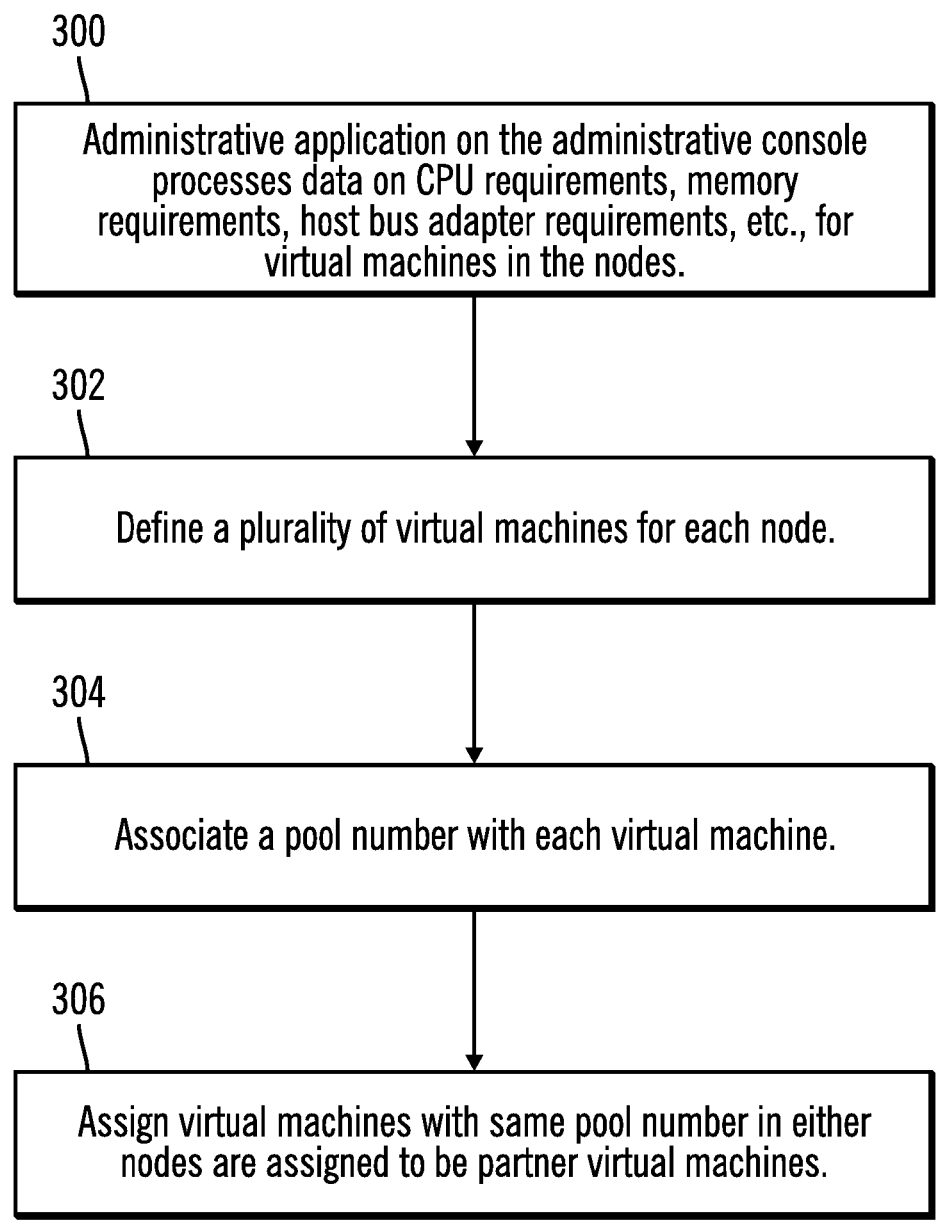
FIG. 3 illustrates logic for implementing partner virtual machines, in accordance with certain described implementations of the invention.

FIG. 3 illustrates logic for implementing the partner virtual machines 200a . . . 200n, in accordance with certain described implementations of the invention. The logic of FIG. 3 is implemented by the administrative application 126 and the one or more partitioning applications 116, 122. In certain alternative embodiments, the partitioning applications 116, 122 or elements of the partitioning applications 116, 122 may also reside in the host bus adapters 104a . . .

104*m*. Although, the embodiments illustrate two partitioning application 116, 122 there may be fewer or more partitioning applications. Additionally, the two partitioning applications 116 and 122 may be combined or referred to as a single partitioning application, such as, a hypervisor.

Control starts at block 300, where the administrative application 126 on the administrative console 106 processes data on CPU requirements, memory requirements, host bus adapter requirements, etc., for virtual machines in the nodes 108, 110. In certain embodiments, such data on CPU requirements, memory requirements, host bus requirements, etc., may be entered by configuration files created by a user on the administrative console 106 or entered directly by the user.

Based on the data on CPU requirements, memory requirements, host bus requirements, etc., the partitioning applications 116, 122 define (at block 302) the plurality of virtual machines 114*a* . . . 114*n*, 120*a* . . . 120*n* for the nodes 108, 110. For example, the partitioning application 116 may define the plurality of virtual machines 114*a* . . . 114*n* for the node 108 and the partitioning application 122 may define the plurality of virtual machines 120*a* . . . 120*n* for the node 110.

The partitioning applications 116, 122 associate (at block 304) a pool number with the virtual machines in a node. For example, the partitioning application 116 may associate pool numbers that numerically range from 1 to n, for virtual machines 114*a* . . . 114*n* in node 108. The partitioning application 122 may associate the same pool numbers that numerically range from 1 to n, for virtual machines 120*a* . . . 120*n* in node 110.

The partitioning applications 116, 122 assign (at block 306) virtual machines with the same pool number in either nodes 108, 110 to be partner virtual machines. For example, if pool number one has been associated with virtual machines 114*a* and 120*a*, then virtual machines 114*a* and 120*a* are assigned to be partner virtual machines, such as partner virtual machines 200*a*.

Therefore, the logic of FIG. 3 illustrates how the partitioning applications 116, 122 in association with the administrative application create partner virtual machines 200*a* . . . 200*n* within the ESS unit 100.

Figure 4:
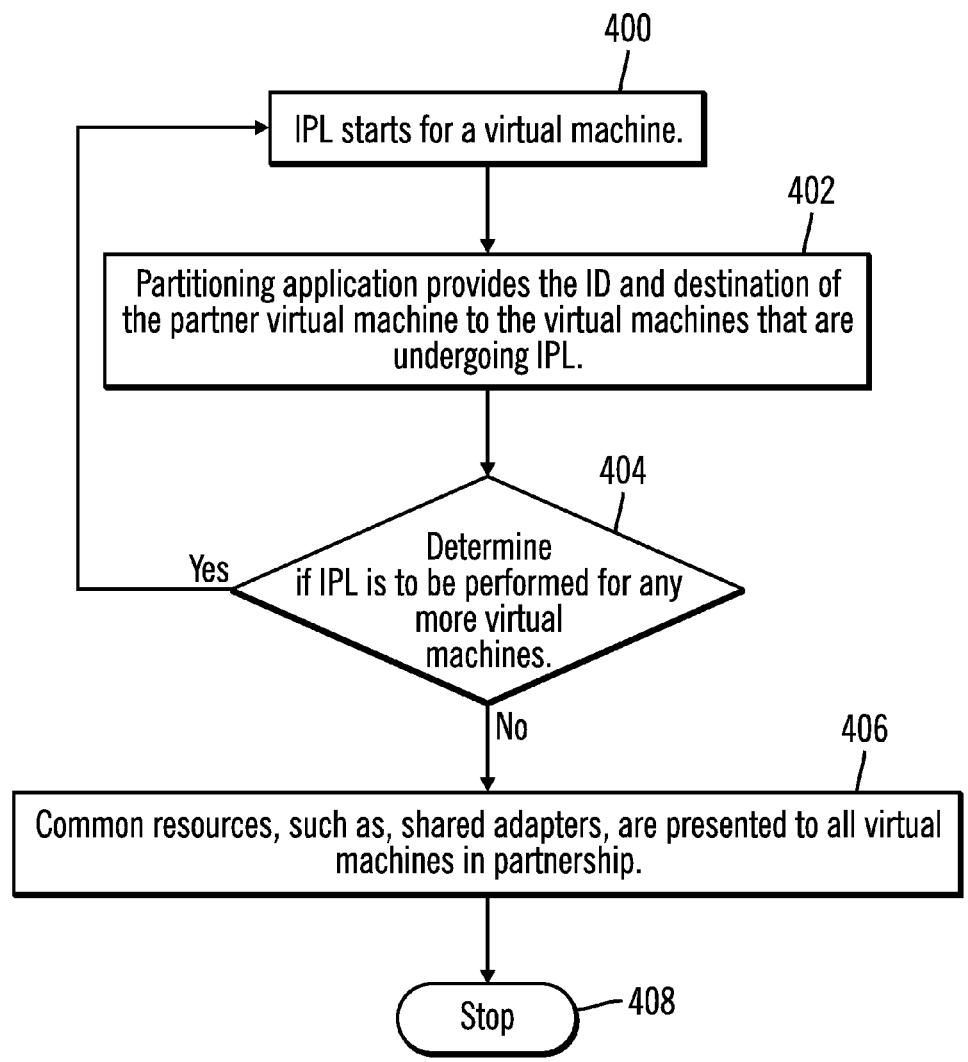
FIG. 4 illustrates logic for initial program load of partner virtual machines, in accordance with certain described implementations of the invention.

FIG. 4 illustrates logic for initial program load (IPL) of partner virtual machines 200*a* . . . 200*n*, in accordance with certain described implementations of the invention. In certain embodiments, the logic for initial program load may be implemented in the partitioning applications 116, 122.

Control starts at block 400, where the partitioning applications 116, 122 start the IPL for a virtual machine, such as, virtual machine 114*a* . . . 114*n*, 120*a* . . . 120*n*. The partitioning applications 116, 122 provide (at block 402) the identification and destination of the partner virtual machine to the virtual machine that is undergoing IPL. For example, if the virtual machine 114*a* is undergoing IPL, then the identification and destination of the partner virtual machine 120*a* is provided to the virtual machines 114*a*.

The partitioning applications 116, 122 determine (at block 404) if IPL is to be performed for any more virtual machines. If not, the partitioning applications 116, 122 present (at block 406) common resources, such as shared adapters including host bus adapters 104*a* . . . 104*m*, to the virtual machines in partnership and the process for IPL stops (at block 408). For example, in certain embodiments, the partitioning applications 116, 122 may present the host bus adapter 104*a* to be shared between the virtual machines 114*a* and 120*a*, and the host bus adapter 104*b* to be shared between the virtual machines 114*b* and 120*b*.

If the partitioning applications 116, 122 determine (at block 404) that IPL has to be performed for more virtual machines, then control returns to block 400 where the partitioning applications 116, 122 initiate IPL for additional virtual machines.

Therefore, the logic of FIG. 4 illustrates how the partitioning applications 116, 122 during IPL present common resources to all virtual machines in partnership. For example, the virtual machines 114*a*, 114*b* may be presented with common resources, such as, host bus adapter 104*a*, to communicate to the host 102.

Figure 5:
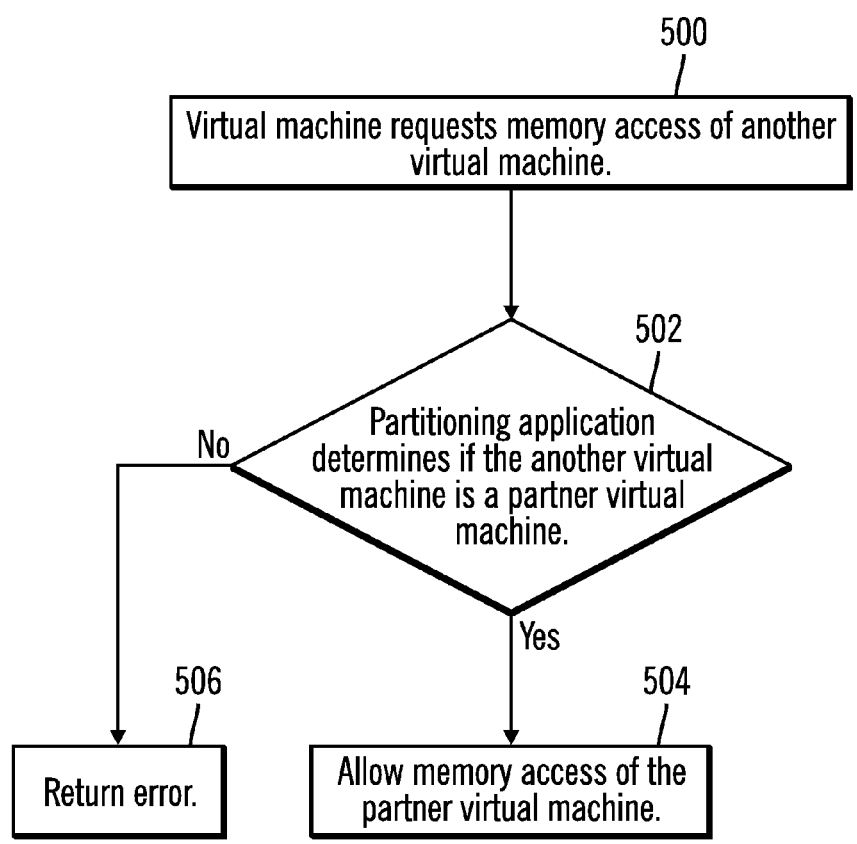
FIG. 5 illustrates logic for providing security for memory access in partner virtual machines, in accordance with certain described implementations of the invention.

FIG. 5 illustrates logic for providing security for memory access in partner virtual machines 200*a* . . . 200*n*, in accordance with certain described implementations of the invention. In certain embodiments, the logic for providing security for memory access may be implemented in the partitioning applications 116, 122.

Control starts at block 500, where a virtual machine that may be referred to as a requestor virtual machine, requests memory access from another virtual machine. For example, requestor virtual machines 114*a* may request memory access from virtual machine 120*a*. The partitioning applications 116, 122 determine (at block 502) if the another virtual machine whose memory access is requested is a partner virtual machine of the requestor virtual machine. If so, then the partitioning applications 116, 122 allow (at block 504) memory access of the another virtual machine to the requester virtual machine. For example, if the requestor virtual machine is 114*a* requests memory access from the partner virtual machine 120*a* the memory access is allowed.

If the partitioning applications 116, 122 determine (at block 502) that the another virtual machine whose memory access is requested is not a partner virtual machine of the requestor virtual machine then the partitioning applications 116, 122 does not allow the memory access and returns (at block 506) an error.

Therefore, FIG. 5 illustrates how the partitioning applications 116, 122 allow memory access requests between virtual machines that are partners of each other. In certain alternative embodiments, only certain memory accesses may be allowed even between virtual machines that are partners.

Figure 6:
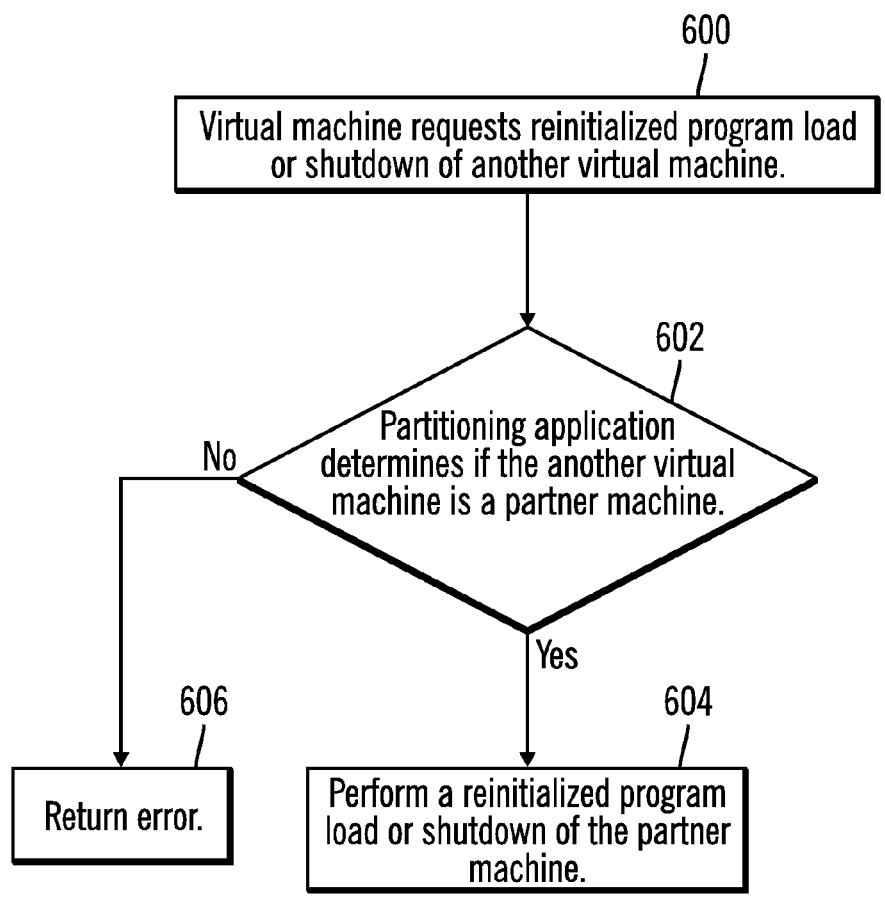
FIG. 6 illustrates logic for providing security for reinitializing partner virtual machines, in accordance with certain described implementations of the invention.

FIG. 6 illustrates logic for providing security for reinitializing program load in partner virtual machine 200*a* . . . 200*n*, in accordance with certain described implementations of the invention. In certain embodiments, the logic for providing security for reinitializing program load in partner virtual machines may be implemented in the partitioning applications 116, 122.

Control starts at block 600, where a virtual machine that may be referred to as a requestor virtual machine, generates a request for reinitializing program load for another virtual machine. For example, requestor virtual machine 114*a* may request a reinitialized program load for virtual machine 120*a*. The partitioning applications 116, 122 determine (at block 602) if the another virtual machine whose reinitialized program load is requested is a partner virtual machine of the requester virtual machine. If so, then the partitioning applications 116, 122 allow (at block 604) the reinitialized program load of the another virtual machine to be controlled from the requestor virtual machine. For example, if the requestor virtual machine 114*a* requests reinitialized program load for the partner virtual machine 120*a*, then the reinitialized program load is allowed.

If the partitioning applications 116, 122 determine (at block 602) that the another virtual machine whose reinitialized program load is requested is not a partner virtual machine of the requestor virtual machine then the partitioning applications 116, 122 do not allow the reinitialized program load and return (at block 606) an error.

Therefore, FIG. 6 illustrates how the partitioning applications 116, 122 allow a reinitialized program load between virtual machines that are partners of each other. In certain alternative embodiments, a shutdown request of another virtual machine from a requestor virtual machine operates in a similar manner.

Figure 7:
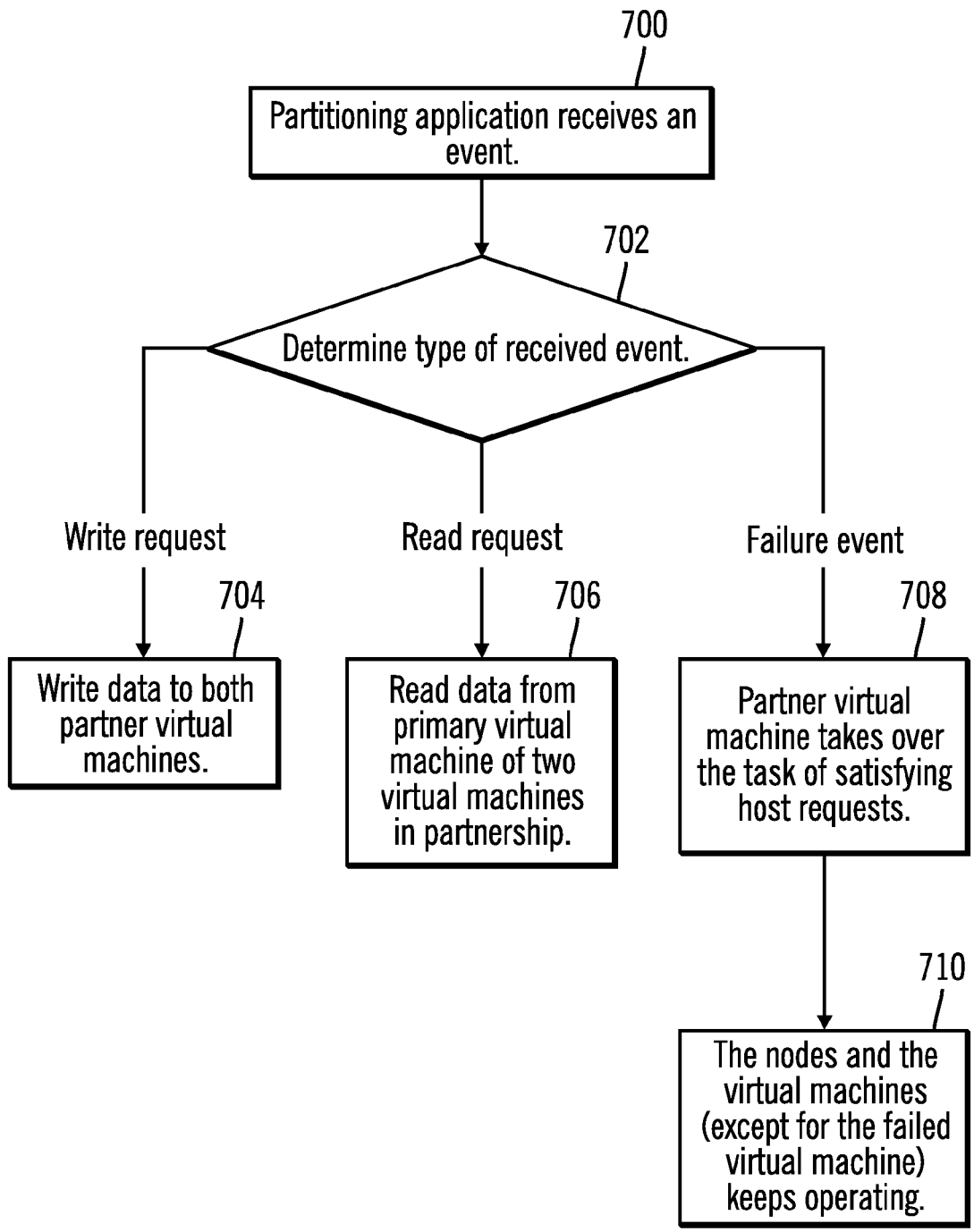
FIG. 7 illustrates logic for processing reads, writes, and failures in partner virtual machines, in accordance with certain described implementations of the invention.

FIG. 7 illustrates logic for processing reads, writes, and failures in partner virtual machines 200a . . . 200n, in accordance with certain described implementations of the invention. In certain embodiments, the logic for providing the processing of reads, writes, and failures in partner virtual machines 200a . . . 200n may be implemented in the partitioning applications 116, 122.

Control starts at block 700, where the partitioning applications 116, 122 receive a notification of an event. The partitioning applications 116, 122 determine (at block 702) the type of the received event notification.

If the determined event is a write request, then the partitioning applications 116, 122 write (at block 704) data corresponding to the write request to a virtual machine and a partner of the virtual machine. For example, in response to a write request the partitioning applications 116, 122 may write data corresponding to the write request to virtual machines 114a and 120a that are partner virtual machines.

If the determined event is a read request, then the partitioning applications 116, 122 read (at block 706) data corresponding to the read request from the primary virtual machine of the partner virtual machines. For example, if virtual machine 114a is designated as a primary virtual machine and the data in storage of virtual machine 114a is mirrored in secondary virtual machine 120a, then the partitioning applications 116, 122 read data corresponding to the read request from the virtual machine 114a.

If the determined event is a failure event of a primary virtual machine, then the partitioning applications 116, 122 cause (at block 708) the partner of the failed primary virtual machine to take over the task of satisfying requests from the host 102. In certain embodiments, the nodes 108, 110 and the virtual machines except for failed virtual machine keep (at block 710) operating.

Therefore, FIG. 7 illustrates how the partitioning applications 116, 122 handle read operations, write operations, and failures of a virtual machine. In certain embodiments, in the event of a failure of a virtual machine, the node that includes the failed virtual machine does not cease to operate.

The implementations create a plurality of logical processing units, i.e., virtual machines, from a plurality of processing nodes. A pair of logical processing units form a redundant system, where if a logical processing unit is unavailable, the other logical processing unit may be used to substitute the unavailable logical processing unit. In certain embodiments, the processing node that includes the unavailable logical processing unit continues to operate. Therefore, the unavailability of a logical processing unit does not lead to shutdown of a processing node. Furthermore, logical processing units that are partners appear identical to the host. So the failure of one logical processing unit may not be apparent to the host, as the system may keep on functioning with the partner logical processing unit assuming the functions of the failed logical processing unit.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 8:
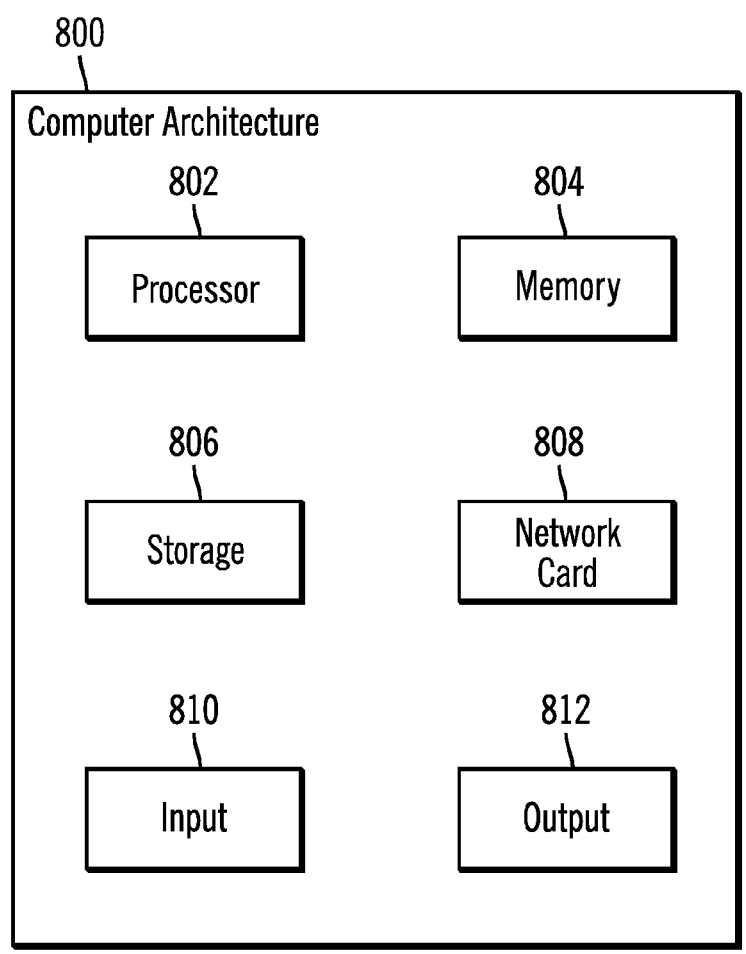
FIG. 8 illustrates a block diagram of a computer architecture in which certain described aspects of the invention are implemented.

FIG. 8 illustrates a block diagram of a computer architecture in which certain aspects of the invention are implemented. FIG. 8 illustrates one implementation of the host 102, the administrative console 106, and the nodes 108, 110. The host 102, the administrative console 106, and the nodes 108, 110 may implement a computer architecture 800 having a processor 802, a memory 804 (e.g., a volatile memory device), and storage 806 (e.g., a non-volatile storage, magnetic disk drives, optical disk drives, tape drives, etc.). The storage 806 may comprise an internal storage device, an attached storage device or a network accessible storage device. Programs in the storage 806 may be loaded into the memory 804 and executed by the processor 802 in a manner known in the art. The architecture may further include a network card 808 to enable communication with a network. The architecture may also include at least one input 810, such as a keyboard, a touchscreen, a pen, voice-activated input, etc., and at least one output 812, such as a display device, a speaker, a printer, etc.

The logic of FIGS. 3, 4, 5, 6 and 7 describe specific operations occurring in a particular order. Further, the operations may be performed in parallel as well as sequentially. In alternative implementations, certain of the logic operations may be performed in a different order, modified or removed and still implement implementations of the present invention. Morever, steps may be added to the above described logic and still conform to the implementations. Yet further steps may be performed by a single process or distributed processes.

Many of the software and hardware components have been described in separate modules for purposes of illustration. Such components may be integrated into a fewer number of components or divided into a larger number of components. Additionally, certain operations described as performed by a specific component may be performed by other components.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method, comprising:

partitioning a plurality of processing nodes in a storage system into a plurality of logical processing units, wherein the plurality of logical processing units can respond to I/O requests from a host coupled to the storage system;

grouping at least two logical processing units, wherein data in a first storage coupled to a first processing unit of the least two logical processing units is mirrored by data in a second storage coupled to the second logical processing unit of the at least two logical processing units; and in response to a failure of the first logical processing unit, responding to an I/O request from the host via the second logical processing unit, wherein the method further comprises:

(i) receiving from the first logical processing unit, a request for a reinitialized program load of a logical processing unit;

(ii) determining, by one or more partitioning applications coupled to the plurality of logical processing units, whether the logical processing unit is grouped with the first logical processing unit;

(iii) if the logical processing unit is grouped with the first logical processing unit, then allowing the reinitialized program load of the logical processing unit; and (iv) if the logical processing unit is not grouped with the first logical processing unit, then preventing the reinitialized program load of the logical processing unit.

2. The method of claim 1, wherein the storage system has at least two processing nodes, wherein the plurality of logical processing units are distributed across the at least two processing nodes, wherein one processing node includes a plurality of central processing units, and wherein in the event of the failure of the first logical processing unit, the plurality of processing nodes stay operational.

3. The method of claim 1, wherein an administrative console is coupled to the plurality of processing nodes of the storage system, further comprising:

prior to partitioning, processing, at the administrative console, information on processing requirements, memory requirements and host bus adapter requirements for the plurality of logical processing units.

4. The method of claim 1, wherein one or more partitioning applications are coupled to the plurality of logical processing units, further comprising:

in response to grouping the at least two logical processing units, starting initial program load of the first logical processing unit;

determining via the one or more partitioning applications an identification of the second logical processing unit grouped with the first logical processed unit; and presenting, by the one or more partitioning applications, common resources to the first and second logical processing units.

5. The method of claim 1, further comprising:

receiving from the first logical processing unit, a request for memory access of a logical processing unit;

determining, by the one or more partitioning applications coupled to the plurality of logical processing units, whether the logical processing unit is grouped with the first logical processing unit;

if the logical processing unit is grouped with the first logical processing unit, then allowing the memory access of the logical processing unit to the first logical processing unit; and if the logical processing unit is not grouped with the first logical processing unit, then preventing the memory access of the logical processing unit to the first logical processing unit.

6. The method of claim 1, further comprising:

receiving a write request from the host to the plurality of processing nodes in the storage system; and writing, by the one or more partitioning applications, data corresponding to the write request to the first storage coupled to the first logical processing unit and the second storage coupled to the second logical processing unit.

7. A method, comprising:

partitioning a plurality of processing nodes in a storage system into a plurality of logical processing units, wherein the plurality of logical processing units can respond to I/O requests from a host coupled to the storage system;

grouping at least two logical processing units, wherein data in a first storage coupled to a first logical processing unit of the least two logical processing units is mirrored by data in a second storage coupled to the second logical processing unit of the at least two logical processing units; and in response to a failure of the first logical processing unit, responding to an I/O request rom the host via the second logical processing unit, wherein the partitioning and grouping further comprises:

(i) associating first pool numbers sequentially to a first set of logical processing units included in a first processing node;

(ii) associating second pool numbers sequentially to a second set of logical processing units included in a second processing node; and (iii) assigning pairs of logical processing units with the same associated pool numbers to be partner virtual machines, wherein the partner virtual machines mirror each other and provide redundancy.

8. The method of claim 7, further comprising:

receiving a read request from the host to the plurality of processing nodes in the storage system; and reading, by one or more partitioning applications, data corresponding to the read request from the first storage coupled to the first logical processing unit.

9. The method of claim 7, wherein the partitioning and grouping are performed by one or more partitioning applications coupled to the plurality of processing nodes, wherein the one or more partitioning applications comprise a hypervisor application of a redundant system.

10. A system, comprising:

a storage system;

a plurality of processing nodes in the storage system;

means for partitioning the plurality of processing nodes in the storage system into a plurality of logical processing units, wherein the plurality of logical processing units can respond to I/O requests from a host coupled to the storage system;

means for grouping at least two logical processing units, wherein data in a first storage coupled to a first logical processing unit of the least two logical processing units is mirrored by data in a second storage coupled to the second logical processing unit of the at least two logical processing units; and means for responding to an I/O request from the host via the second logical processing unit in response to a failure of the first logical processing unit, wherein the system further comprises:
  (i) means for receiving from the first logical processing unit, a request for a reinitialized program load of a logical processing unit;
  (ii) means for determining, by one or more partitioning applications coupled to the plurality of logical processing units, whether the logical processing unit is grouped with the first logical processing unit;
  (iii) means for allowing the reinitialized program load of the logical processing unit; if the logical processing unit is grouped with the first logical processing unit; and
  (iv) means for preventing the reinitialized program load of the logical processing unit if the logical processing unit is not grouped with the first logical processing unit.

11. The system of claim 10, wherein the storage system has at least two processing nodes, wherein the plurality of logical processing units are distributed across the at least two processing nodes, wherein one processing node includes a plurality of central processing units, and wherein in the event of the failure of the first logical processing unit, the plurality of processing nodes stay operational.

12. The system of claim 10, further comprising:
an administrative console coupled to the plurality of processing nodes of the storage system; and
means for processing, at the administrative console, information on processing requirements, memory requirements and host bus adapter requirements for the plurality of logical processing units.

13. The system of claim 10, further comprising:
one or more partitioning applications coupled to the plurality of logical processing units;
means for starting initial program load of the first logical processing unit, in response to grouping the at least two logical processing units;
means for determining via the one or more partitioning applications an identification of the second logical processing unit grouped with the first logical processed unit; and
means for presenting, by the one or more partitioning applications, common resources to the first and second logical processing units.

14. The system of claim 10, further comprising:
means for receiving from the first logical processing unit, a request for memory access of a logical processing unit;
means for determining, by the one or more partitioning applications coupled to the plurality of logical processing units, whether the logical processing unit is grouped with the first logical processing unit;
means for allowing the memory access of the logical processing unit to the first logical processing unit if the logical processing unit is grouped with the first logical processing unit; and
means for preventing the memory access of the logical processing unit to the first logical processing unit if the logical processing unit is not grouped with the first logical processing unit.

15. The system of claim 10, further comprising:
means for receiving a write request from the host to the plurality of processing nodes in the storage system; and
means for writing, by the one or more partitioning applications, data corresponding to the write request to the first storage coupled to the first logical processing unit and the second storage coupled to the second logical processing unit.

16. A system, comprising:
a storage system;
a plurality of processing nodes in the storage system;
means for partitioning the plurality of processing nodes in the storage system into a plurality of logical processing units, wherein the plurality of logical processing units can respond to I/O requests from a host coupled to the storage system;
means for grouping at least two logical processing units, wherein data in a first storage coupled to a first logical processing unit of the least two logical processing units is mirrored by data in a second storage coupled to the second logical processing unit of the at least two logical processing units; and
means for responding to an I/O request from the host via the second logical processing unit in response to a failure of the first logical processing unit, wherein the partitioning and grouping further comprises:
  (i) means for associating first pool numbers sequentially to a first set of logical processing units included in a first processing node;
  (ii) means for associating second pool numbers sequentially to a second set of logical processing units included in a second processing node; and
  (iii) means for assigning pairs of logical processing units with the same associated pool numbers to be partner virtual machines, wherein the partner virtual machines mirror each other and provide redundancy.

17. The system of claim 16, further comprising:
means for receiving a read request from the host to the plurality of processing nodes in the storage system; and
means for reading, by one or more partitioning applications, data corresponding to the read request from the first storage coupled to the first logical processing unit.

18. The system of claim 16, wherein the partitioning and grouping are performed by one or more partitioning applications coupled to the plurality of processing nodes, wherein the one or more partitioning applications comprise a hypervisor application of a redundant system.

19. A computer readable storage medium including code, wherein the code when executed by a processor causes operations, the operations comprising:
partitioning a plurality of processing nodes in a storage system into a plurality of logical processing units, wherein the plurality of logical processing units can respond to I/O requests from a host coupled to the storage system;
grouping at least two logical processing units, wherein data in a first storage coupled to a first logical processing unit of the least two logical processing units is mirrored by data in a second storage coupled to the second logical processing unit of the at least two logical processing units; and
in response to a failure of the first logical processing unit, responding to an I/O request from the host via the second logical processing unit, the operations further comprising:

(i) receiving from the first logical processing unit, a request for a reinitialized program load of a logical processing unit;
(ii) determining, by one or more partitioning applications coupled to the plurality of logical processing units, whether the logical processing unit is grouped with the first logical processing unit;
(iii) if the logical processing unit is grouped with the first logical processing unit, then allowing the reinitialized program load of the logical processing unit; and
(iv) if the logical processing unit is not grouped with the first logical processing unit, then preventing the reinitialized program load of the logical processing unit.

20. The computer readable storage medium of claim 19, wherein the storage system has at least two processing nodes, wherein the plurality of logical processing units are distributed across the at least two processing nodes, wherein one processing node includes a plurality of central processing units, and wherein in the event of the failure of the first logical processing unit, the plurality of processing nodes stay operational.

21. The computer readable storage medium of claim 19, wherein an administrative console is coupled to the plurality of processing nodes of the storage system, the operations further comprising:
prior to partitioning, processing, at the administrative console, information on processing requirements, memory requirements and host bus adapter requirements for the plurality of logical processing units.

22. The computer readable storage medium of claim 19, wherein one or more partitioning applications are coupled to the plurality of logical processing units, the operations further comprising:
in response to grouping the at least two logical processing units, starting initial program load of the first logical processing unit;
determining via the one or more partitioning applications an identification of the second logical processing unit grouped with the first logical processed unit; and
presenting, by the one or more partitioning applications, common resources to the first and second logical processing units.

23. The computer readable storage medium of claim 19, the operations further comprising:
receiving from the first logical processing unit, a request for memory access of a logical processing unit;
determining, by the one or more partitioning applications coupled to the plurality of logical processing units, whether the logical processing unit is grouped with the first logical processing unit;
if the logical processing unit is grouped with the first logical processing unit, then allowing the memory access of the logical processing unit to the first logical processing unit; and
if the logical processing unit is not grouped with the first logical processing unit, then preventing the memory access of the logical processing unit to the first logical processing unit.

24. The computer readable storage medium of claim 19, the operations farther comprising:
receiving a write request from the host to the plurality of processing nodes in the storage system; and
writing, by the one or more partitioning applications, data corresponding to the write request to the first storage coupled to the first logical processing unit and the second storage coupled to the second logical processing unit.

25. A computer readable storage medium including code, wherein the code when executed by a processor causes operations, the operations comprising:
partitioning a plurality of processing nodes in a storage system into a plurality of logical processing units, wherein the plurality of logical processing units can respond to I/O requests from a host coupled to the storage system;
grouping at least two logical processing units, wherein data in a first storage coupled to a first logical processing unit of the least two logical processing units is mirrored by data in a second storage coupled to the second logical processing unit of the at least two logical processing units; and
in response to a failure of the first logical processing unit, responding to an I/O request from the host via the second logical processing unit, wherein the partitioning and grouping further comprises:
(i) associating first pool numbers sequentially to a first set of logical processing units included in a first processing node;
(ii) associating second pool numbers sequentially to a second set of logical processing units included in a second processing node; and
(iii) assigning pairs of logical processing units with the same associated pool numbers to be partner virtual machines, wherein the partner virtual machines mirror each other and provide redundancy.

26. The computer readable storage medium of claim 25, the operations further comprising:
receiving a read request from the host to the plurality of processing nodes in the storage system; and
reading, by one or more partitioning applications, data corresponding to the read request from the first storage coupled to the first logical processing unit.

27. The computer readable storage medium of claim 25, wherein the partitioning and grouping are performed by one or more partitioning applications coupled to the plurality of processing nodes, wherein the one or more partitioning applications comprise a hypervisor application of a redundant system.

* * * * *